United States Patent [19]
Rice et al.

[11] Patent Number: 5,979,593
[45] Date of Patent: Nov. 9, 1999

[54] HYBRID MODE-SCATTERING/SOUND-ABSORBING SEGMENTED LINER SYSTEM AND METHOD

[75] Inventors: Edward J. Rice, Westlake, Ohio; Bruce E. Walker, Westlake Village; Alan S. Hersh, Calabasas, both of Calif.

[73] Assignee: Hersh Acoustical Engineering, Inc., Westlake Village, Calif.

[21] Appl. No.: 08/784,732

[22] Filed: Jan. 13, 1997

[51] Int. Cl.$^6$ ..................................................... F01D 25/04
[52] U.S. Cl. ......................... 181/207; 415/119; 381/71.5; 381/71.7; 381/71.8; 73/570
[58] Field of Search ..................... 73/570, 587; 181/206, 181/207; 137/15.1; 244/1 N; 381/71.1, 71.2, 71.4, 71.5, 71.7, 71.8, 71.9, 71.11, 71.12, 71.13, 71.14; 415/119

[56] References Cited

U.S. PATENT DOCUMENTS

| | | | |
|---|---|---|---|
| H1357 | 9/1994 | Ng et al. .................................... | 381/71 |
| 3,936,606 | 2/1976 | Wanke .................................... | 179/1 P |
| 3,937,590 | 2/1976 | Mani ........................................ | 415/119 |
| 3,946,830 | 3/1976 | Kutney et al. ........................... | 415/119 |
| 4,044,263 | 8/1977 | Swinbanks .............................. | 179/1 P |
| 4,104,002 | 8/1978 | Ehrich .................................... | 415/119 |
| 4,109,108 | 8/1978 | Crown et al. ............................ | 179/1 P |
| 4,192,336 | 3/1980 | Farquhar et al. ....................... | 137/15.1 |
| 4,199,295 | 4/1980 | Raffy et al. ............................. | 415/115 |
| 4,419,045 | 12/1983 | Andre et al. ............................ | 415/119 |
| 4,783,817 | 11/1988 | Hamada et al. ......................... | 381/71 |
| 5,060,471 | 10/1991 | Torkelson .............................. | 415/119 |
| 5,119,427 | 6/1992 | Hersh et al. ............................ | 381/71 |
| 5,325,661 | 7/1994 | Rice ....................................... | 60/204 |
| 5,370,340 | 12/1994 | Pla .......................................... | 381/71 |
| 5,377,275 | 12/1994 | Suzuki .................................... | 381/71 |
| 5,382,134 | 1/1995 | Pla et al. ................................. | 415/119 |
| 5,498,127 | 3/1996 | Kraft et al. ............................. | 415/119 |
| 5,702,230 | 12/1997 | Kraft et al. ............................. | 415/119 |

OTHER PUBLICATIONS

"Evaluation of Optimized Multisectioned Acoustic Liners", K.J. Baumeister, AIAA Article No. 79–0182R, vol. 17, No. 11, Nov. 1979, pp. 1185–1192.

"Duct Liner Optimization for Turbomachinery Noise Sources", Harold C. Lester and Jose W. Posey, Report No. NASA TM X–72789, Nov. 1975, pp. 1–19.

"Optimal One–Section and Two–Section Circular Sound-–Absorbing Duct liners for Plane–Wave and Monopole Sources Without Flow", Harold C. Lester and Jose W. Posey, Report No. NASA TN D–8348, Dec. 1976, p. 51.

"Analytical and Experimental Studies of an Optimum Multisegment Phased Liner Noise Suppression Concept", David T. Sawdy, Roy J. Beckemeyer, and John D. Patterson, Boeing Report No. D3–9812–1, May 1976, pp. i–xvii, 1–91.

"Experimental–Analytical Correlation of Optimum Duct Acoustic Liner Performance", John D. Patterson, David T. Sawdy, and Roy J. Beckemeyer, Report No. A76–25856, Mar. 1976, p. 12.

(List continued on next page.)

Primary Examiner—Hezron Williams
Assistant Examiner—Rose M. Miller
Attorney, Agent, or Firm—Blakely, Sokoloff, Taylor & Zafman LLP

[57] ABSTRACT

A hybrid mode-scattering/sound-absorbing segmented liner system and method in which an initial sound field within a duct is steered or scattered into higher-order modes in a first mode-scattering segment such that it is more readily and effectively absorbed in a second sound-absorbing segment. The mode-scattering segment is preferably a series of active control components positioned along the annulus of the duct, each of which includes a controller and a resonator into which a piezoelectric transducer generates the steering noise. The sound-absorbing segment is positioned acoustically downstream of the mode-scattering segment, and preferably comprises a honeycomb-backed passive acoustic liner. The invention is particularly adapted for use in turbofan engines, both in the inlet and exhaust.

30 Claims, 8 Drawing Sheets

OTHER PUBLICATIONS

"Optimum Segmented Acoustic Liners for Flow Ducts", David T. Sawdy, Roy J. Beckemeyer, and John D. Patterson, Report No. A76–25129, Nov. 1975, pp. i–iii, 1–47.

"Acoustic Theory of Axisymmetric Multisectioned Ducts", William E. Zorumski, Report No. NASA–TR R–419, May 1974, pp. iii, 1–32.

Modal Propagation Angles in Ducts with Soft Walls and Their Connection with Suppressor Performance, E.J. Rice, Nasa Lewis Research Center, Cleveland, Ohio, Mar. 12–14, 1979, pp. 1–9.

"Effects of Multi–Element Acoustic Treatment on Compressor Inlet Noise", R.E. Kraft and J.E. Paas, AIAA Paper No. 76–515, Report No. A76–38043, Jul. 20–23, 1976, pp. 1–10.

HYBRID MODE-SCATTERING/SOUND-ABSORBING SEGMENTED LINER SYSTEM AND METHOD

STATEMENT OF GOVERNMENT INTEREST

The U.S. Government has limited rights in this invention as provided by the terms of NASA Cooperative Agreement No. NCC3-379 as it applies to Hersh Acoustical Engineering, Inc. This contract was awarded by the National Aeronautics and Space Administration (NASA).

FIELD OF THE INVENTION

This invention relates generally to the field of acoustic liner systems and methods in ducts (e.g., turbofan engines), and more particularly to a hybrid mode-scattering/sound-absorbing segmented liner system and method in which an initial liner segment uses active control components to acoustically scatter or steer lower-radial order modes into higher-order radial modes, thereby increasing the total sound absorbed by the system.

BACKGROUND OF THE INVENTION

Increasing worldwide concern over aircraft noise during landing and takeoff, and its impact on communities surrounding commercial airports, has led to more stringent regulation of permissible engine noise. Proposed regulations would restrict many older second-generation aircraft from landing in some of the world's airports because of excessive noise levels.

In the United States, the National Aeronautics and Space Administration (NASA) has proposed a goal of reducing jet noise by 7–10 EPNdB by the year 2000, and the International Civil Aviation Organization (ICAO) is considering imposing stricter noise standards internationally. Such goals and regulations could sideline many aircraft that would otherwise have decades of useful service left. See, e.g., Published Goals, NASA Advanced Subsonic Technology Program.

The aircraft industry currently relies on passive noise suppression hardware to reduce engine noise, which consist of arrays of resonators that line the interior surface of engine ducts. These are typically constructed with porous air-passage face sheets that are bonded to closed back cavities. The cavities commonly comprise honeycomb cells that are bonded to a solid backing plate that provides a rigid reflecting surface. These nacelle liners, however, are limited at reducing engine noise to meet potential stricter noise standards. This problem is exacerbated by trends in new jet-engine designs to have shorter engine ducts with larger diameters.

Properly configured multi-layered passive liners increase the sound attenuation of turbofan engines, but increase size, cost and weight compared to single degree-of-freedom liners. Thus these liners may not be feasible for meeting future international noise regulations.

To date, one approach to solve this problem is application of passive hush kits that provide only modest noise reduction while increasing fuel consumption and decreasing engine performance. These hush kits are merely stop-gap measures, barely bringing engines into compliance with current noise regulations. Consequently, there is a need for a fundamentally different acoustic system that can be retrofitted into existing turbofan engines to bring thousands of current turbofan engines into compliance with future noise abatement requirements without decreasing performance. In addition, it would be highly desirable if such a system was relatively inexpensive to manufacture, install and maintain.

Recently, acoustical researchers have turned to active noise control to attenuate undesirable noise by measuring the frequency, phase and amplitude of the noise using microphones and signal-processing techniques to generate anti-waves to cancel or reflect the noise. This technique, however, has been difficult to apply to real-world phenomena with complex sound-field patterns, particularly to cancel the highly complex radial and spinning modes generated by the rotor-stator interactions within jet aircraft engines.

One promising line of active noise control research employs sound absorption, rather than cancellation or reflection of the noise, by generating acoustic waves within Helmholtz resonators, thereby optimizing the resistance and reactance of the resonator. Installing active-control transducers within resonator cavities protects the transducers from the harsh environment within turbofan engines, increasing their efficiency over a broad range of frequencies above and below the naturally tuned frequency of the resonator. The use of active control to re-tune a resonator is described in detail in Hersh et al., U.S. Pat. No. 5,119,427, which is incorporated by reference herein.

All active noise control techniques face numerous technical hurdles before they can effectively absorb, cancel or scatter sound in complex sound-field patterns such as those generated by the rotor-stator interaction in turbofan engines. One such obstacle is the amount of acoustic energy that is required to absorb or reflect the high-amplitude noise within a turbofan engine. But the primary obstacle that remains to be solved is to determine and create proper sound wave patterns to absorb, cancel or scatter the complex radial and spinning modes within turbofan engines.

The rotor-stator interaction in a turbofan engine generates spinning and radial modes in which each sound mode propagates out of the inlet or exhaust duct at an angle relative to the duct axis. This propagation angle is dependent upon the mode structure and the sound frequency. Typically, the modes with simpler structure propagate with smaller angles relative to the duct axis than the more complex or higher-order modes. This results in relatively few encounters by the wave front with the acoustic liner on the periphery of the inlet or exhaust duct, limiting the effectiveness of the acoustic liner to absorb noise. This problem is exacerbated by modern turbofan engines that have very short inlet and exhaust ducts.

Experiments were conducted in the 1970's using segmented passive liners in which a first passive liner segment modified the boundary condition along the duct wall, which changed the average propagation angle of the sound field so that it encountered the passive liner of the second and other segments at greater angles and thus with more encounters. This resulted in greater attenuation of the segmented system than a uniform passive liner without the mode-scattering effect of the first segment. See Sawdy, D. T., Beckemeyer, R. J. and Patterson, J. K., "Analytical and Experimental Studies of an Optimum Multiple Segment Phased Liner Noise Suppression Concept," NASA CR-134960, May 1976; Lester, H. C. and Posey, J. W., "Optimal One-Section and Two-Section Circular Sound Absorbing Duct Liner for Plane-Wave and Monopole Sources without Flow," NASA TN D-8348, December 1976; and Kraft, R. E. and Paas, J. E., "Effects of Multi-Element Acoustic Treatment on Compression Inlet Noise," AIAA Paper No. 76-515, Presented at $3^{rd}$ AIAA Aeroacoustics Conference, Palo Alto, Calif., July 1976. Research has recently shown that the propagation angles were intimately related to the mode cut-off ratios, attenuation in the duct liners, and the far-field radiation angles. Rice, E. J., "Modal Propagation Angles in Ducts with Soft Walls and Their Connection with Suppressor Performance," NASA Technical Memorandum 79081, Presented at 5th AIAA Aeroacoustics Conference, Seattle, Wash., March 1979.

Another way of understanding the propagation angle relative to frequency is in terms of the mode-cutoff ratio. Each mode in a cylindrical or annular duct is characterized by a circumferential and radial structure that may be defined in terms of the circumferential periods (the number of times the wave repeats around the circumference of the duct) and the number of radial pressure nodes. Typically, these are identified by the indices m and n, respectively, using nomenclature (m,n). Thus, mode (0,0) is a simple axial wave with no structure and propagates parallel to the duct axis. Mode (1,0) has circumferential structure that repeats once around the duct and has no radial nodes. Mode (13,2) repeats 13 times around the duct and has two radial nodes. Each of these modes is characterized by a lower limit frequency that is inversely proportional to the duct diameter, such that at frequencies less than the limit, the duct does not support wave motion in that mode. This limit is defined as the modal cutoff frequency. The cutoff ratio is the ratio of the sound frequency to the cutoff frequency for a given mode and duct size.

The propagation angle is a monotonically decreasing function of the cutoff ratio. For a cutoff ratio of unity, the propagation angle is 90 degrees (perpendicular to the duct axis); for extremely large cutoff ratios, the propagation angle approaches 0 degrees (parallel to the duct axis). The actual expressions for cutoff frequency as functions of m and n are determined from solutions to Bessel's equation and are not simple expressions. However, a good rule of thumb is that higher mode indices result in lower cutoff ratios and therefore higher propagation angles.

Most experiments on passive segmented liners conducted in the 1970s involved rectangular ducts with two-dimensional sound fields generated by loudspeakers to verify the general theory. Some experiments investigated circular ducts with two-dimensional sound fields. Most of these experiments showed reasonable agreement with the theory after employing iterative adjustments to the initial modal structure and the wall impedance.

To our knowledge, only one experiment tested the performance of a passive segmented liner system to sound fields resembling the spinning modes produced by the rotor-stator interaction of a turbofan engine. See Lester, H. C. and Posey, J. W., "Duct Liner Optimization for Turbomachinery Noise Sources," NASA Technical Memorandum X-72789, November 1975. In the test, a high-speed 12-inch fan was used to create spinning modes and flow. The test, as did the simpler two-dimensional sound-field experiments, showed a large potential increase in acoustic attenuation for intermediate frequency ranges. The optimum first liner segment tended to have a purely reactive impedance with a very low resistance, which caused minimal dissipation of the sound energy.

The conclusion reached from these tests was that the multi-segmented passive liner system improved sound attenuation by scattering the sound field into higher-order radial modes, increasing the average propagation angle of the sound field. Higher-order radial modes with increased average propagation angles relative to the duct axis are more efficiently attenuated by the second passive liner segment.

Despite some encouraging initial results, studies on multi-segmented passive liners ceased in 1979 after Baumeister published a statistical survey that showed multi-segmented passive liners were very sensitive to the relative amplitude and phases of the incident sound fields. Thus their performance was enhanced only very near their optimum design conditions, such as at a particular engine rotational speed. Baumeister, K. J., "Evaluation of Optimized Multi-sectioned Acoustic Liners," AIAA Journal, Vol. 17, No. 11, pp. 1185–1192, November 1979. At other rotational speeds, the performance of the segmented liner was no better than that of conventional uniform impedance liners. His conclusion was that segmented liners were not worth pursuing, and Baumeister and others abandoned research in this area. A review of the literature suggests that there has been no further publication nor substantial progress in this technology since 1979.

SUMMARY OF THE INVENTION

The present invention solves the above-mentioned problems by combining the emerging active noise control technology with the multi-segmented passive liner approach to create a hybrid mode-scattering/sound-absorbing segmented liner system and method. It is an object of the present invention to use active-control techniques not to reflect, cancel or absorb noise, but to change the boundary impedance to shift or scatter relatively low-order modes into higher-order modes, thereby increasing the average propagation angle of the sound field relative to the duct axis. This allows the sound-absorbing liner segment to more efficiently absorb the unwanted noise. (Although not necessarily an essential element of the present invention, the injected noise may also cancel, reflect or absorb a portion of the sound field).

The desired boundary impedance modification is preferably attained by use of a modified version of the active-control resonator system described in Hersh et al., U.S. Pat. No. 5,119,427, which is incorporated by reference. However, it is possible to use an active-control system without a resonator for the mode-scattering segment of the acoustic liner system, or to couple an active-control component with a passive liner for the mode-scattering segment.

It is a further object of the present invention to include a controller for the active-control components of the mode-scattering segment (there may be one or more active-control components; the number to be determined according to the discussion in the detailed description section below). In the case of multiple active control components, each component may have a separate controller, or preferably, all active control components are controlled by a single controller. The heart of the controller is preferably a digital signal processor (DSP), which may be an application specific integrated circuit for mass production, or a programmable DSP for small production quantities.

One embodiment may include a passive segment between the active portion of the mode-scattering segment and the noise-generating source (e.g., the rotor-stator system). This would attenuate the high amplitude sound field before it reaches the active-control portion of the mode-scattering segment. One advantage of such a system would be to reduce the required sound pressure level of the sound-generating sources. Another advantage would be to reduce or eliminate interference that may result from high-amplitude non-linear interaction from the circumferential change in the boundary condition between the sound-generating sources and the rotating pressure field of the rotor or other source of the unwanted noise. Thus in some applications, having the sound-generating sources too close to the source of the unwanted noise could create interference that would hurt the performance of the mode-shaping/sound-absorbing segmented liner, or increase the noise produced by the unwanted source.

In the embodiments tested, a piezoelectric sound source was used as the sound-generating source, which is located within the resonator cavity. The piezoelectric element minimizes the size and weight of the sound source, and enables the sound source to more readily withstand the intense pressures and temperatures within an aircraft engine. However, a conventional speaker may be used, and may be preferable for use in less hostile environments, or where weight, size and durability are not significant factors. Alternately, pneumatic oscillators or fluidic amplifiers may be used for applications requiring very high amplitude sound-generating sources.

The sound-absorbing segment of the acoustic liner system may be any standard type of passive nacelle liner, typically an aluminum or composite sheet having numerous holes layered over a honeycomb backing that forms a system of locally reacting sound-absorbing resonators that is fixed into place along the interior annulus of the engine duct. However, the sound-absorbing segment could comprise other passive liner designs.

Alternately, the sound-absorbing segment may include, or solely comprise, an active control component to reflect, cancel or absorb the noise. Such a system would be a hybrid active-active segmented liner system in which the first segment of active control components shifted or scattered the sound field into high-order modes with an increased average propagation angle such that the second active-control segment more effectively reflected, canceled or absorbed the noise. The sound-absorbing segment could comprise multiple segments, and may include both active and passive sound-absorption sub-segments.

It is a further object of the present invention to obtain an electrical signal representation of the sound to be scattered and absorbed. In the preferred embodiment, a fan tachometer or other non-acoustical pick-up devices are used to measure the rotational speed of the fan, from which the blade-passing rate and resulting frequency may be calculated depending upon the number of rotors. However, one or more microphones, or arrays of microphones, or other sound-pressure measuring devices, may alternately be used to actually measure the sound or sound field.

In the preferred embodiment, the hybrid system includes a feedback mechanism for adaptively adjusting to changing sound fields and to ensure that the mode-scattering segment is maximizing the increase of the average propagation angle. This can be accomplished by measuring the sound field directly acoustically downstream of the mode-scattering segment, or by measuring the sound field downstream of the sound-absorbing segment. In the former embodiment, the controller of the system maximizes the mode-scattering effect; in the latter embodiment, the controller minimizes the amplitude of the residual sound. In either feedback technique, the mode-scattering effect is maximized to minimize the resulting sound field after it is absorbed by the sound-absorbing segment.

In the preferred embodiment of the present invention, the latter feedback technique is employed, and the residual sound field is measured by an array of flush-mounted microphones positioned acoustically downstream of the sound-absorbing segment.

For turbofan engine applications, the hybrid mode-scattering/sound-absorbing system of the present invention may be used upstream or downstream of the rotors and stators within a jet aircraft engine, or both, to reduce inlet or exhaust noise. In either case, the mode-scattering segment is closest to the rotors and stators, and the sound-absorbing segment is opposite the rotors and stators, closer to the inlet or outlet of the engine duct, as the case may be. The mode-scattering segment is upstream of the passive segment relative to the acoustic energy flow direction in the engine duct, which begins at the rotor-stator interface and travels in opposite directions towards the inlet and exhaust.

A further object of the present invention is that the sound-absorbing liner, preferably a passive liner, is in a favorable position to absorb any spurious radiation (modal spill-over) that may be generated from the active mode-scattering section due to imperfections in the hardware or control signals, such as actuator sensitivity mismatch, harmonic distortion, electronic noise, etc.

While the present invention is especially directed towards use in turbofan engines, it is applicable for absorbing noise in any duct-like environment. In particular, the present invention is useful for applications in a variety of noise-control applications, such as turboprops, turbines, industrial furnaces, generators, and heating, ventilation and air-conditioning systems.

BRIEF DESCRIPTION OF THE DRAWINGS

The several features and advantages of the present invention will be better understood from a reading of the following detailed description in conjunction with the drawings, in which.

DETAILED DESCRIPTION OF THE INVENTION

1. Definitions

Figure 1:
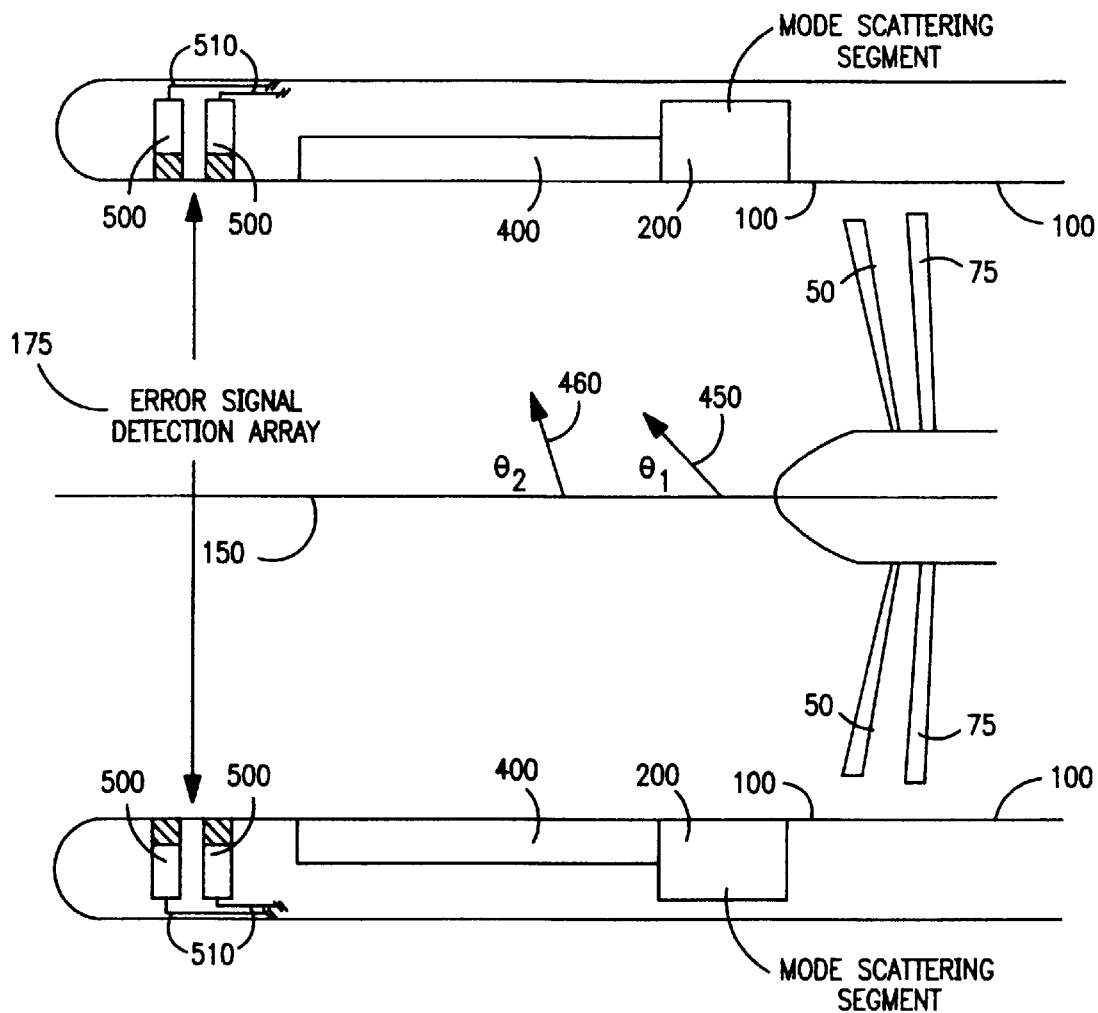
FIG. 1 shows a portion of a longitudinal cross-sectional view of a hybrid mode-scattering/sound-absorbing segmented liner in a turbofan engine duct in accordance with the preferred embodiment of the present invention.

For purposes of this patent, including the claims that follow, a "sound field" shall mean sound or noise having a particular modal configuration and a particular distribution of propagation angles relative to the axis of the duct; however, the modal configuration and propagation-angle distribution of the sound field may be different at different locations in the duct. The "sound field" would have a weighted average propagation angle determined from the strength and propagation angles of the individual modes in the sound field. Consequently, a "sound field" shall refer broadly to the sound field at any position in the duct, regardless of its particular modal configuration and average propagation angle. An "initial sound field" or an "altered sound field" or like designation shall refer to the sound field at a particular longitudinal position within the duct.

For purposes of this patent, including the claims that follow, "determining the sound field", "determining the initial sound field" and "determined from the initial sound field", and similar phrases, shall be broadly construed to include, but not be limited to: directly measuring the sound field, such as by microphones, hot wires or like devices; indirectly calculating the sound field at a first position by measuring the sound field at a second position at which the sound field differs from the first position; indirectly calculating the sound field by prior knowledge or measurement of some physical parameter or parameters indicative of the sound field (e.g., calculating the sound field generated by the rotor-stator interaction in a particular engine by knowledge or measurement of the rotational speed of the fan, and the aerodynamic properties of the flow through the fan stage); and estimating the sound field by prior knowledge of the particular duct system that generates the sound field.

Thus "determining the sound field" does not necessarily result in a precise or accurate representation of the sound field. Different applications and different designs of the present invention place very different constraints on the required accuracy of determining the sound field.

For purposes of this patent, including the claims that follow, "mode scattering" shall mean the redistribution of acoustic energy of a sound field from being carried by modal compositions having low-order modes to being carried by predominantly higher-order modes. One manifestation of this would be to increase the average propagation angle of the sound field relative to the duct axis, thereby increasing the average propagation time of the sound field through the sound-absorbing portion of the duct. In particular, "mode scattering" shall include shifting or scattering low-ordered radial modes into higher-order radial modes within the nacelle of a turbofan engine, which is the application and mode type the preferred embodiment seeks to attenuate. "Mode Scattering" shall also include scattering from non-radial modes, such as plane waves, and scattering acoustical energy between spinning modes of unequal circumferential (m) order. Further, in non-cylindrical geometries the description of modes in terms of circumferential and radial components may be inappropriate. The concept of scattering simpler modal components of the initial sound field into more complex ones that are more efficiently absorbed by passive liner elements remains valid in non-cylindrical environments.

In the above definition, "low-order modes" and "higher-order modes" are relative to particular modal compositions and not to any absolute or quantifiable measure of what constitutes a low- or higher-order mode. Consequently, what one may consider a high-order mode would be construed as a low-order mode in this definition if it is transformed into a higher-order mode.

In the claims that follow, a "mode-scattering segment" and similar phrases shall thus mean a segment or other object that performs mode scattering as defined above, and "mode scatters" shall be an active verb for "mode scattering".

For purposes of this patent, including the claims that follow, "circumferential" and "circumferentially" shall include near-circular shapes, such as oval ducts, elliptical ducts and similar shapes, in addition to cylindrical ducts.

2. The Preferred Embodiment

Identical reference numerals in the drawings denote the same elements throughout the various drawings. However, the various drawings are not drawn to scale, but for illustrative purposes of the basic relative configurations.

FIG. 1 shows the basic configuration of a hybrid mode-scattering/sound-absorbing segmented liner of the present invention. While the drawings show an application in a jet aircraft engine, the system would also be effective in any duct through which noise propagates, with or without the flow of air or other gases. In FIG. 1, fan 50 generates a quasi-periodic unsteady flow field that is influenced by stators 75, which typically generate acoustic noise in the form of blade-passage harmonic frequencies in spinning modes, each with one or more radial orders that propagate upstream and downstream along duct axis 150 and exit the turbofan engine inlet 175 and the jet exhaust (not shown).

The portion of the turbofan engine shown in FIG. 1 is the inlet portion of the turbofan engine; however, those skilled in the art will appreciate that the present invention can be adapted to reduce exhaust noise at the other side of the stators 75.

The direction vector of radial order n of the sound field generated by the interaction of fan 50 and stators 75 propagates at an initial angle $\theta_1$ 450 relative to longitudinal duct axis 150. The higher the radial order, the greater the deviation of the angle from duct axis 150. Thus, when $\theta$ is small, the angle of the sound field is substantially parallel to duct axis 150, and when $\theta$ approaches 90 degrees, the angle of the sound field is substantially perpendicular to duct axis 150.

Figure 2:
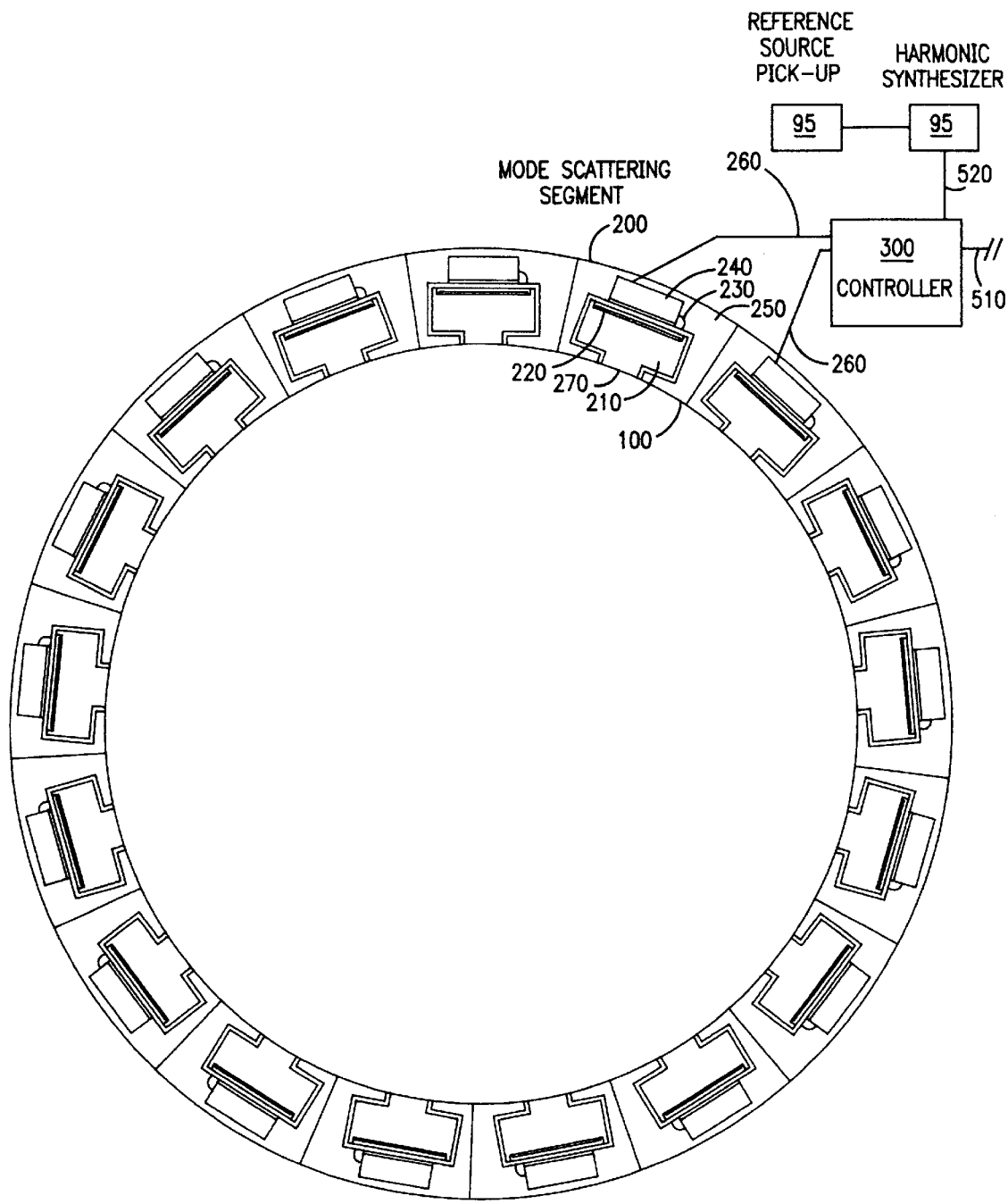
FIG. 2 shows an axial cross-sectional view of one row of active-control components within the mode-scattering segment of the hybrid mode-scattering/sound-absorbing segmented liner of FIG. 1.

In the example shown in FIGS. 1–2, the initial sound field would be dominated by relatively low-order radial modes and have a low average propagation angle $\theta_1$ 450 such that the wave front encounters duct wall 100 at a low incidence angle. The present invention uses active-control resonator components 250 (not shown in FIG. 1) in mode-scattering segment 200 to change the boundary conditions along duct wall 100 to tailor the resistance and reactance to transform the sound field into higher-order radial modes and increase the average propagation angle $\theta_1$ 450 to a higher average propagation angle $\theta_2$ 460. This increases the incidence angles of the sound field within passive liner segment 400 as the sound field propagates through and exits the engine duct. The higher-order radial modes and corresponding greater average propagation and incidence angles enhances the sound absorption by sound-absorbing segment 400.

The sound absorption of sound-absorbing segment 400 for the sound field of propagation angle $\theta_2$ 460 at the higher-order radial modes exceeds what the sound absorption would be if passive liner 400 extended over the area of mode-scattering liner segment 200 for the lower-order radial modes having propagation angle $\theta_1$ 450, that is, without the mode-scattering effect of mode-scattering segment 200.

In the preferred embodiment, the mode-scattering effect of the active-control resonator components 250 (not shown in FIG. 1) is maximized by positioning error-signal detection array 500 acoustically downstream of both mode-scattering segment 200 and sound-absorbing segment 400, as shown in FIG. 1. If error-signal detection array 500 were instead placed acoustically upstream of sound-absorbing segment 400 using standard active-control techniques (i.e., minimizing the error-microphone signal), the overall system would merely result in a combination of an active control segment followed by a passive liner. However, by placing error-signal detection array 500 acoustically downstream of sound-absorbing segment 400, the whole system becomes greater than the sum of its parts, providing greater attenuation than would be expected by combining active and passive segments. One particularly novel feature of the present invention lies in creating a symbiotic relationship between the active and passive segments in which the active segment changes the sound field so that the passive liner can more readily and completely absorb the noise. While the active segment may also absorb or cancel some of the sound field, its primary role is in mode scattering the sound field into higher-order modes that are more readily absorbed by the passive liner.

An alternate method for accomplishing the same results would be to position error-signal detection array 500 between mode-scattering segment 200 and sound-absorbing segment 400, but to control the system to maximize the mode-scattering effect of the active-control resonator components 250 of mode-scattering segment 200 instead of the typical active-control algorithms that instead minimize the sound field.

In the preferred embodiment, and particularly for applications having significant flow speed in the duct, error-signal detection array 500 is positioned equidistant around the annulus of duct wall 100 and flush mounted in parallel rows. The purpose of flush mounting the microphones is to minimize disturbance of the mean flow in the duct. Non-uniform microphone spacing is possible, but may require a more cumbersome signal-processing technique for mode separation.

The number of microphones in error-signal detection array 500 depends upon the mode structure of the sound field generated by the noise source, and signal-to-noise considerations. In general, the minimum number of microphones is one greater than twice the highest m-order absolute value ($2m_{max}+1$). However, if the noise source produces a single dominant m-order mode (possibly with multiple radial orders), as few as one microphone at each axial station may be adequate. Furthermore, there must be a sufficient number of microphones to avoid false error minima resulting from nodes caused by destructive interference between modes at a particular plane. For this reason, for applications having more than one radial-order mode in the sound field, more than one row of microphones is needed. Adding microphones (with appropriate modal weightings) improves the error signal-to-noise ratio by approximately 10 times the common logarithm of the number of microphones per row or annulus.

Figure 8:
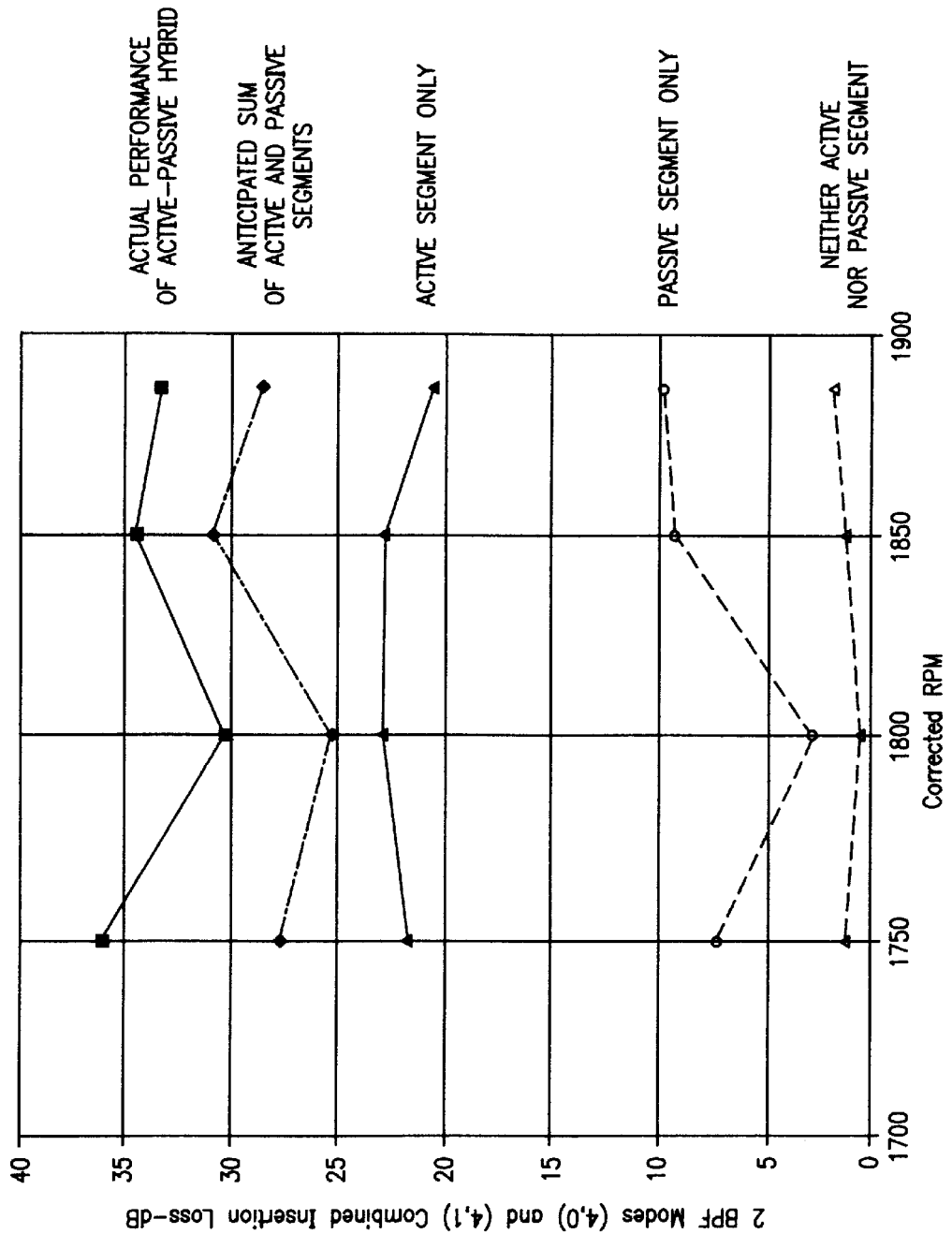
FIG. 8 shows a graph of experimental results of an embodiment of the present invention demonstrating the increased sound-absorption due to the symbiotic relationship of the mode-scattering segment and the sound-absorbing segment.

The number of circular rows of microphones (or microphone annuli) in error-signal detection array 500 is equal to the maximum number of radial order components, spaced less than one half the axial wavelength of the sound in the duct. The embodiment shown in FIG. 1 shows two rows of microphones in error-signal detection array 500 because one particular application of the current invention was designed to suppress two radial-order modes (−9,0) and (−9,1). As will be discussed in greater detail below, the embodiment tested as shown in FIG. 8 had three parallel rows of 16 microphones per row, and the embodiment tested in FIG. 9 had two parallel rows of 18 microphones per row.

Figure 3:
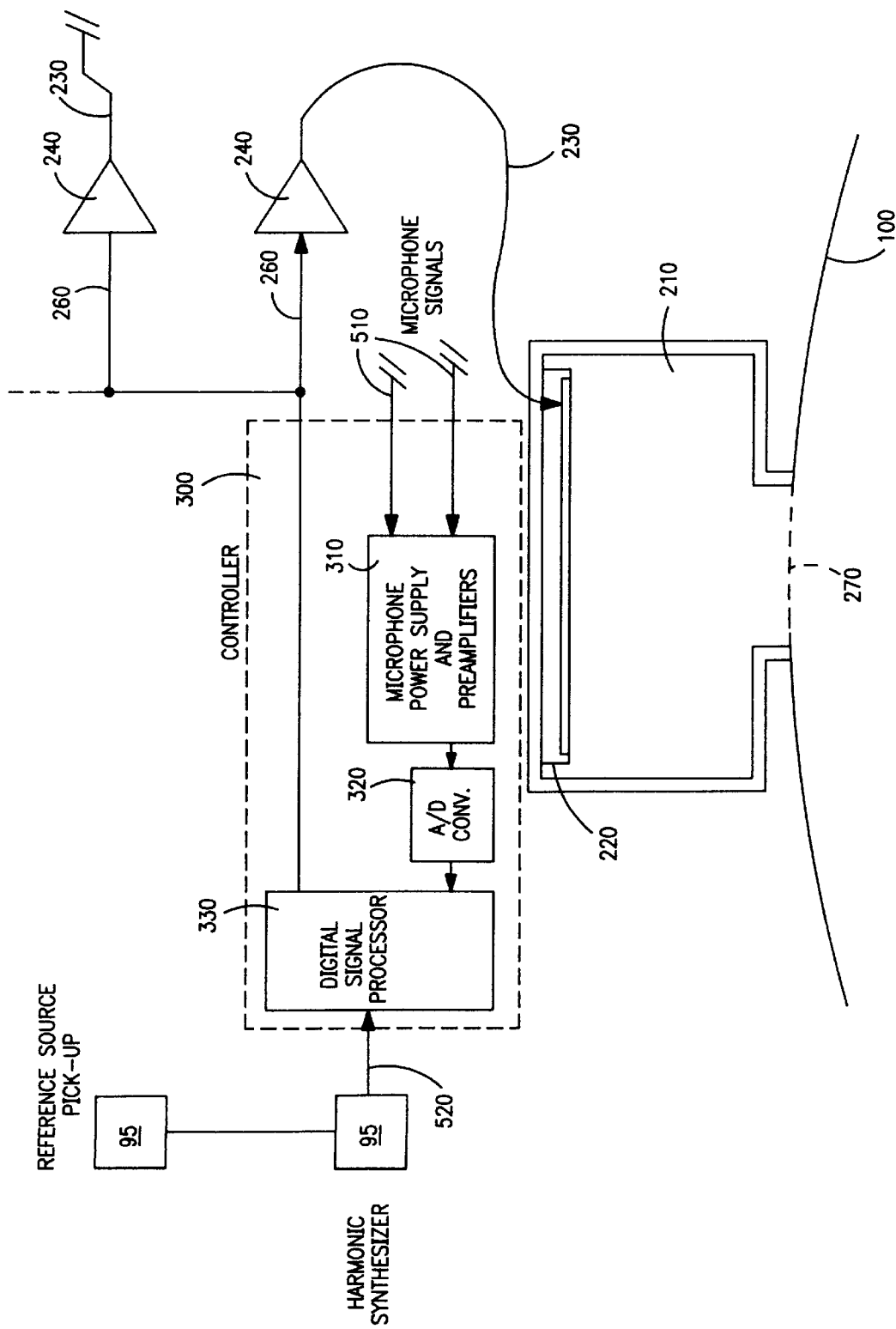
FIG. 3 shows a schematic view of the controller used in the mode-scattering segment of the hybrid mode-scattering/sound-absorbing segmented liner of FIG. 1.

Error-signal detection array 500 generates error signals that are transmitted along error signal inputs 510 to microphone pre-amplifier, power supply and m-order mode separation network 310, as shown in FIGS. 2–3. The m-order mode separation is accomplished by performing real-time cross-correlations between the signal distribution from the circumferentially spaced microphones and the known circumferential pressure distributions of the modes. This may be done using analog weighting and summation networks or digital signal processing. Each spinning mode is the superposition of two circumferentially stationary modes. This allows the m-order mode separation weights to be real-valued so that with uniformly spaced microphone arrays, simple resistive summing networks are adequate. The resulting signal from m-order mode separation network 310, is then passed through analog-to-digital converter 320 to digital signal processor 330. Those skilled in the art will recognize that microphone signals may be digitized directly, and that the mode separation computed digitally. Also note that if the sound to be controlled is well defined as a single m-order mode, mode separation may be unnecessary.

In the embodiment shown in the various figures, there is no input microphone or other sound-pressure measuring device to determine the initial sound field. Instead, the initial sound field is calculated from the blade-passing rate of fan 50 in light of stators 75. The blade-passing rate, and integer multiples thereof, which are often the dominant frequencies, are readily determined by use of fan tachometer 90 and fan-blade passage harmonic synthesizer 95, as shown in FIG. 3, or by a similar technique or device for determining the rotational speed of fan 50 that is used in turbofan engines. The resulting reference signal 520, which is representative of the blade-passing rate, is transmitted to digital signal processor 330. Alternately, the sound field could be directly measured using an array of flush-mounted microphones or other sound-pressure measuring devices placed between fan 50 and mode-scattering segment 200, and then transmitted to digital signal processor 330. Whatever technique is used, reference signal 520 is representative of the initial sound field in the duct.

FIGS. 2–3 show mode-scattering segment 200 in greater detail, which is comprised of one or more active control components 250. The underlying acoustic properties of an active-control system employing a Helmholtz resonator is described in Hersh et al., U.S. Pat. No. 5,119,427, which is incorporated by reference. However, in the present invention, the desired resistance and reactance of the active-control system is not programmed to maximize sound absorption by the resonator but instead to cause the maximum scattering of acoustical energy from lower to higher radial-order modes.

While the preferred embodiment shows active-control components 250 being an active-control Helmholtz resonator system, those skilled in the art will recognize that other active-control components may be used in its place, such as systems that do not place the active-control sound-generating source within a resonator.

In the present invention, Helmholtz resonator 210 protects the sound-generating source 220 from the duct environment and may be dimensioned to provide desired resistance and reactance characteristics so that if the active portion fails, there are passive benefits; also the amount of energy necessary to achieve a particular boundary condition is typically reduced because of the acoustical gain provided by resonator 210.

The number of active-control resonator components 250 used should be determined by the minimal necessary to meet sound-absorption goals for a particular engine so as to minimize the cost and complexity of the system. In FIG. 2, sixteen (16) active-control Helmholtz resonator systems are shown positioned equidistant around the annulus of planes that are perpendicular to the duct axis 150.

The number of active-control resonator components 250 required in each row or annulus is determined from the sound frequency and the duct geometry. In the preferred embodiment, the sound-generating sources 220 are spaced circumferentially equidistant for signal processing simplicity. At a given frequency, the minimum number of sound-generating sources 220 is $2m_{max}+1$ where $m_{max}$ is the highest m-order mode that has a cutoff ratio of unity or greater for radial order n=0. The number of axially spaced rows of sound-generating sources 220 is determined by the range of n-order modes to be mode scattered at the target m-order. In the preferred embodiment, the minimum number of rows of sound-generating sources 220, or active resonator annuli, would be one greater than the number of radial modes to be mode scattered. For example, in the two demonstration tests, the lowest order [(4,0) or (-9,0)] was to be scattered, requiring two rows of sound-generating sources 220. The axial spacing between the rows of sound-generating sources 220 would be between ¼ and ½ the free space wavelength of the sound.

As shown in FIGS. 2–3, each active-control resonator component 250 is comprised of resonator cavity 210 having orifice 270 connecting resonator cavity 210 to the duct through duct wall 100; a sound-generating source 220 positioned along one wall of resonator 210; and digital-to-analog converter and amplifier 240. Orifice 270 may optionally be covered by a wire-mesh screen; however, it will be understood by those skilled in the art that it is a single orifice for purposes of determining the acoustic properties of resonator 210.

A single controller 300 generates output signals 260 that drive the respective sound-generating source 220 for each active-control resonator components 250. Multi-channel output signal 260 is split and passes through each of the digital-to-analog converters and amplifiers 240, and then each resultant individual-channel output signal 230 is transmitted to each sound-generating source 220, causing each sound-generating source 220 to generate the proper frequency, amplitude and phase such that lower-order modes are mode scattered into higher-order modes.

Digital signal processor 330 determines the appropriate output to cause sound source 220 to generate a sound field to adjust the effective impedance of resonator cavity 210 to create the appropriate boundary condition in the engine duct to scatter lower-order radial modes into higher-order radial modes thereby increasing the average propagation angle $\theta_1$ 450 to average propagation angle $\theta_2$ 460, as shown in FIG. 1. Note that neither average propagation angle 450 or 460 needs to be calculated for the invention to function properly; rather, the resulting average propagation angle $\theta_2$ 460 must be greater than average propagation angle $\theta_1$ 450.

In the preferred embodiment, digital signal processor 330 employs a multi-channeled filtered-X least mean square algorithm, which is generally known in the art. See, e.g., Woodrow & Stearnes, "Adaptive Signal Process," Prentice Hall Signal Processing Series (1st ed.) 1985, pp. 288–294.

The algorithm for the adaptive system is preferably hardwired into digital signal processor 330, which preferably is an integrated circuit that is extremely fast, small, lightweight and cost-effective to mass manufacture. However, those skilled in the art will recognize that digital signal processor 330 could be any programmable computer system or microprocessor. Alternately, other feedback algorithms may be used.

Sound-generating source 220 in the preferred embodiment is a piezoelectric transducer. While some applications may permit the use of conventional speakers, they are impractical for use in hostile environments such as turbofan engines. The strict size and weight limits in an aircraft engine environment make piezoelectric transducers the preferred sound source.

Alternately, and particularly for applications requiring very high amplitude sound, sound-generating source 220 may include pneumatic oscillators or fluidic amplifiers. However, such devices have not been tailored for use in the present invention, nor have any such devices been tested.

In some applications of the present invention, the sound-generating source 220 may be conventional speakers. However, for hostile environments piezoelectric transducers are preferred, which are better able to withstand the intense heat and pressure, and in particular for use in turbofan engines, to meet the strict size and weight limitations. Alternately, pneumatic oscillators or fluidic amplifiers may be used for applications requiring very-high amplitude sound.

Figure 5:
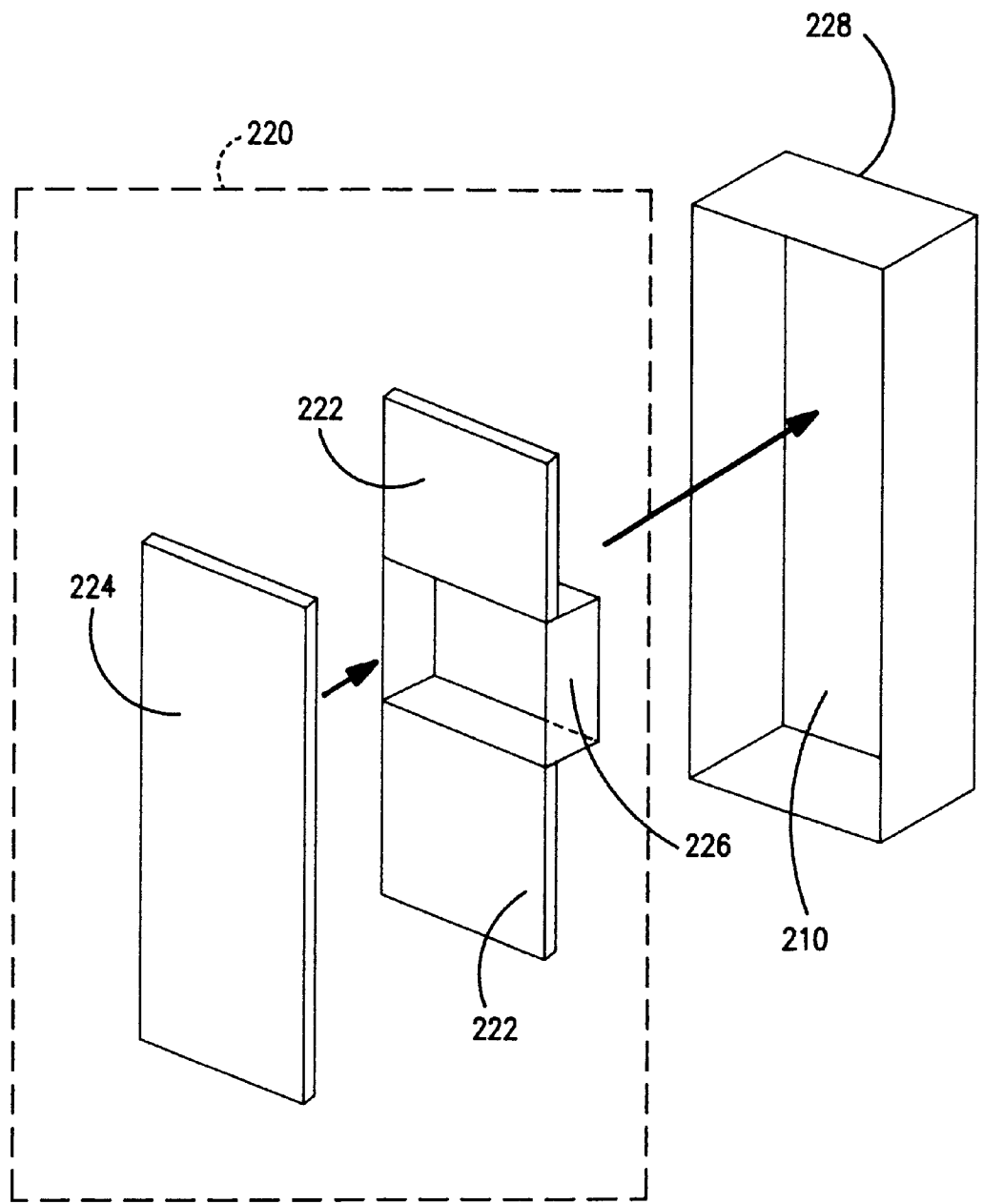
FIG. 5 shows an exploded three-dimensional drawing of a dual cantilever piezoelectric bending element sound source enclosed within a Helmholtz resonator that is the preferred embodiment of the sound-generating component shown in FIGS. 2–3 for certain applications.
Figure 6:
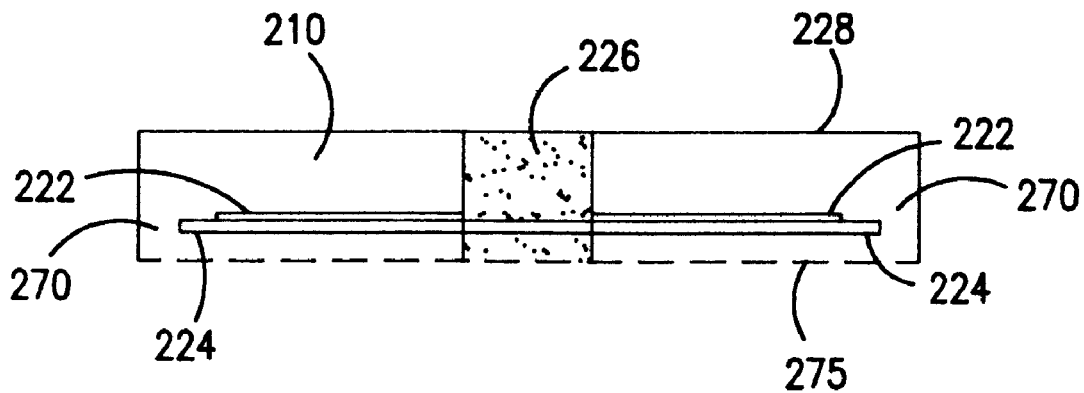
FIG. 6 shows a side view of the dual cantilever piezoelectric bending element of FIG. 5.
Figure 7:
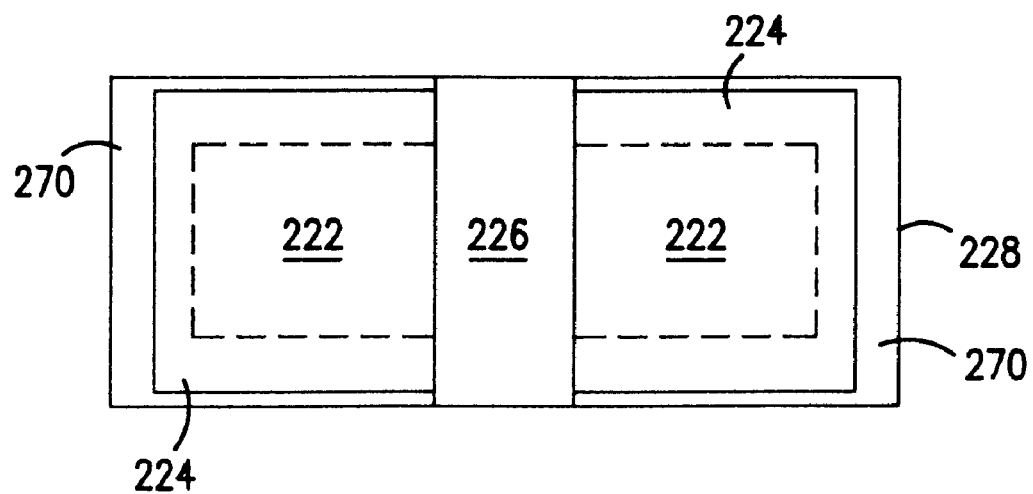
FIG. 7 shows a top view of the dual cantilever piezoelectric bending element of FIG. 5.
Figure 9:
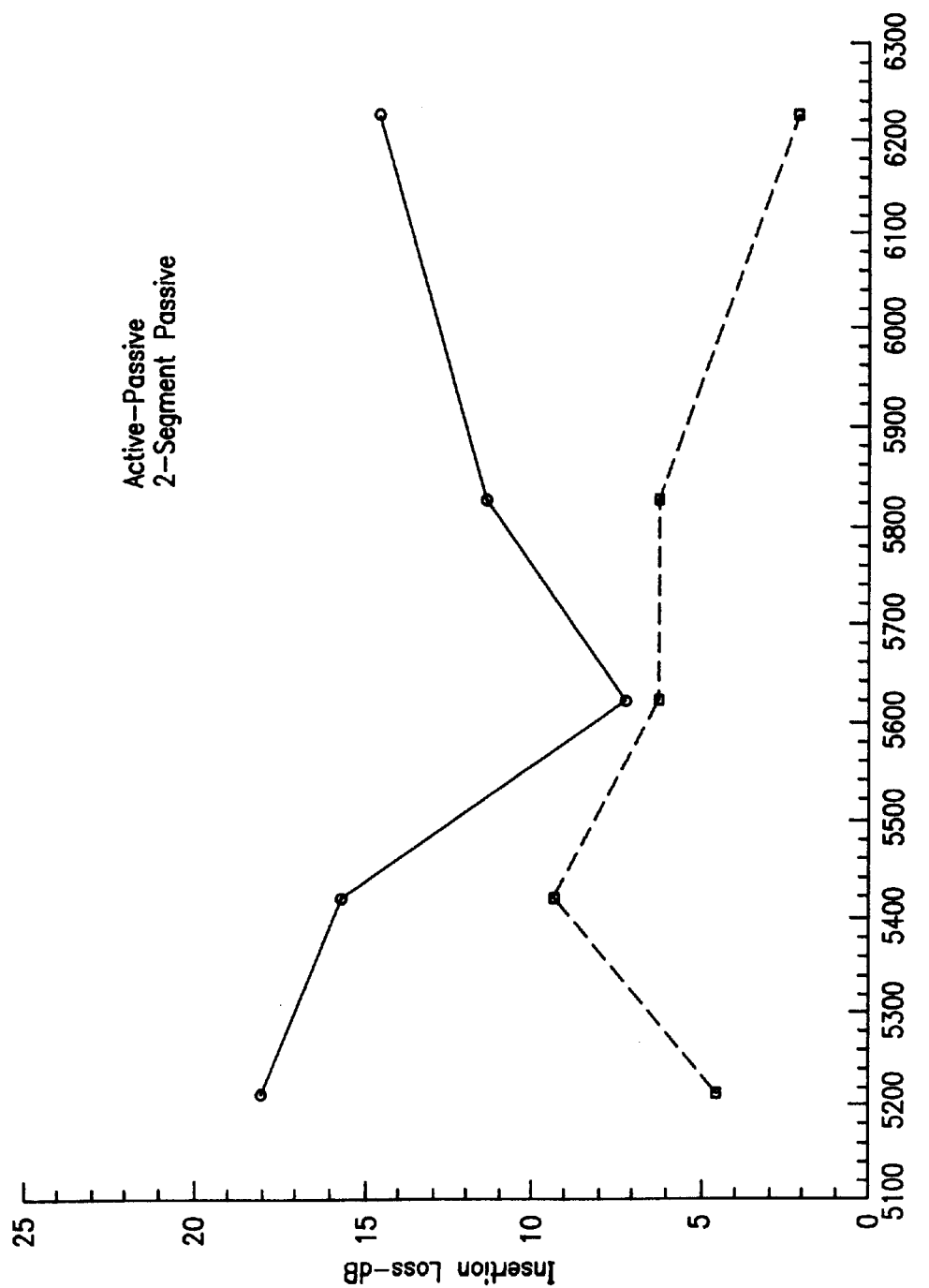
FIG. 9 shows a graph of experiment results of an embodiment of the present invention as applied to a scaled turbofan engine.

For the embodiment for which the results are reported in FIG. 9, the application required sound-generating source 220 to generate sound over an extended frequency range at two relatively closely axially spaced positions. Consequently, sound-generating source 220 for that embodiment was a dual cantilevered piezoelectric bending element, which is shown in FIGS. 5–7. This sound-generating source 220 produced the desired frequency output of 3,000 to 5,000 Hz for the particular test application.

As shown in FIGS. 5–7, sound-generating source 220 includes two bonded layers: an aluminum plate 224, and a piezoelectric layer 222, which contains two separate portions attached to base element 226. Thus sound-generating source 220 contains two separate piezoelectric sources that are built together in a common assembly but act as two nearly independent sound sources. Aluminum plate 224 is larger than piezoelectric layer 222, as shown in FIG. 7, so that it creates a lip that overhangs or extends beyond the boundaries of piezoelectric layer 222; however, this lip is not essential for its operation.

The combination of aluminum plate 224 and piezoelectric layer 222, along with base element 226, are housed within a housing 228, which forms resonator cavity 210. The positioning of aluminum plate 224 and piezoelectric layer 222 relative to base element 226 is selected to define the volume of resonator cavity 210. Furthermore, the size of aluminum plate 224 and piezoelectric layer 222 are selected to provide a gap between aluminum plate 224 and the side walls of housing 228, as shown in FIGS. 6–7. This gap, most of which is on the ends, defines resonator oriface 270, with the gap size selected accordingly. A protective wire-mesh screen 275 covers the front surface of the resonator, which is preferably flush with duct wall 100.

The key to the extended frequency range of the dual cantilever piezoelectric bending element is the interaction between aluminum plate 224 and piezoelectric layer 222 bimorph and the Helmholtz resonator comprised of resonator cavity 210 and the gap (orifice 270). When an electric current from output signal 260 passes through the cantilevered piezoelectric layer 222, it and aluminum plate 224 oscillate and become a piston that moves forward and backward, causing decompression and compression of the air in resonator cavity 210. The size of the gap (orifice 270) between the cantilevered aluminum plate 224/piezoelectric layer 222 bimorph and the sides of housing 228 is determined such that a Helmholtz resonator is created, which acts as a frequency-dependent impedance match to the vibrating cantilevered piezoelectric layer 224 and thus extends the useful frequency range to well below the natural resonance frequency of the cantilever element.

This action is acoustically similar to conventional bass reflex speakers. The size of resonator cavity 210, the exit area, or size of orifice 270, and other parameters of the system may be selected using standard acoustic analyses for a particular application, as discussed in Beranek, L. L., "Acoustics," American Institute of Physics, (2d ed.), 1990, pp. 239–258.

Figure 4:
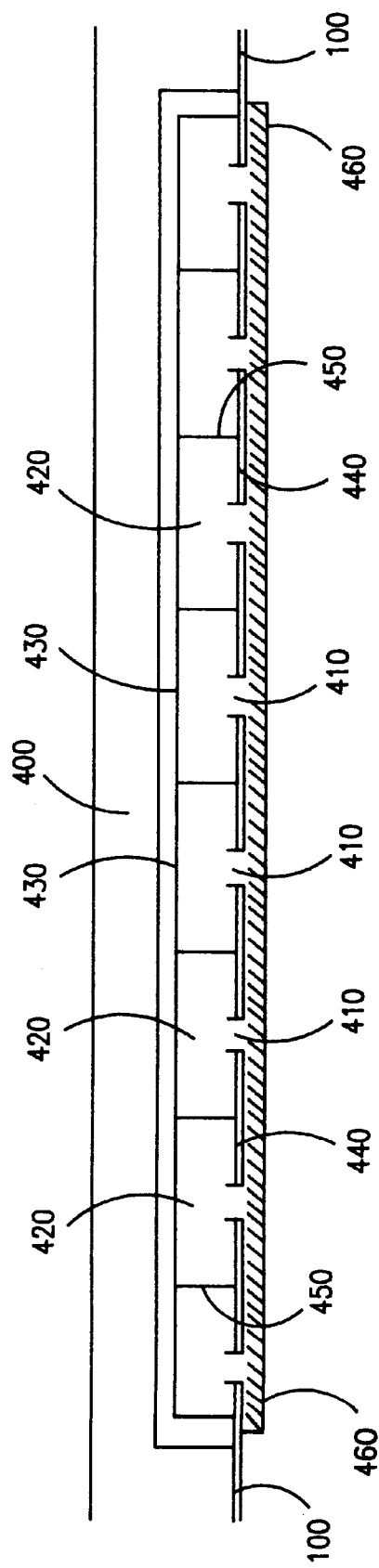
FIG. 4 shows the sound-absorbing liner segment of the hybrid mode-scattering/sound-absorbing segmented liner of FIG. 1.

The preferred embodiment of the sound-absorbing segment 400 is shown in greater detail in FIG. 4. The sound-absorbing segment 400 comprises a passive nacelle liner having an aluminum or composite sheet with numerous holes 410 layered over a honeycomb backing that forms a system of sound-absorbing resonators 420 that are fixed into place along the interior annulus of duct 100. The impervious back plate 430 of sound-absorbing segment 400 isolates the absorber from the remaining nacelle components. A honeycomb layer 450 is bonded to backplate 430 to provide structural strength and to create the appropriate volume for the stiffness reactance of sound-absorbing resonators 420. A highly porous (large open area) course woven composite sheet 440 is bonded to honeycomb layer 450 to provide additional structural strength and some mass reactance for sound-absorbing segment 400. Finally, a very fine wire mesh screen 460 is bonded to composite sheet 440 to provide the acoustic resistance to accomplish the acoustic energy dissipation for sound-absorbing segment 400.

The embodiments of the present invention that were experimentally tested, as shown in FIGS. 8–9, used this type of structure for the sound-absorbing segment 400, which is often referred to as a linear acoustic liner. Such liners are advantageous in that the acoustic impedance may be made relatively insensitive to acoustic pressure amplitude, external flow velocity magnitude and duct wall boundary layer thickness.

Those skilled in the art will recognize that several alternative structures of the sound-absorbing segment 400 are possible. Some examples are as follows: The honeycomb layer 450 may be replaced by any structure that sufficiently segments the resonator back cavity of the sound-absorbing resonators 420. The course woven composite sheet 440 may be replaced by any highly porous material such as a high open area metallic perforated plate. The high acoustic resistance very fine wire mesh 460 may be replaced by any high resistance material, such as a plate with a series of very fine elongated slots. The combination of the very fine wire mesh screen 460 bonded to the course woven composite sheet 440 can be replaced by perforated sheet, metallic or composite, which has sufficiently low open area or porosity to provide sufficient acoustic resistance for sound-absorbing segment 400. An example of a design procedure to achieve a desired acoustic impedance for the wall structure used for the preferred embodiment of sound-absorbing segment 400, with composite sheet 440 replaced by a high-porosity perforated plate, is described in Rice, E. J., "A Model for the Acoustic Impedance of Linear Suppresser Materials Bonded on Perforated Plate", NASA Technical Memorandum 82716, also AIAA Paper Number 81-1999, October 1981.

It will also be recognized by those skilled in the art that the performance of the sound-absorbing segment 400 may be further enhanced by any number of commonly used passive acoustic liner constructions. An example is the broadening of the acoustic power bandwidth by properly designing a multiple layered structure made up of two or more layers of honeycomb separated by resistive porous septa to produce a multiple degree-of-freedom sound-absorbing segment 400.

Alternately, the sound-absorbing segment 400 may include or solely comprise an active-control system for absorbing the sound field with average propagation angle $\theta_2$ 460. While such an active-control system could comprise any active control component(s), it would preferably be an active-control resonator system. One or more of these active-control resonator components could be used in sound-absorbing segment 400, and they may be coupled with any type of passive liner. These active-control components would not perform mode scattering as those in the mode-scattering section; rather, they would be controlled to absorb, reflect or cancel the sound field as used in standard active-control techniques.

3. Test Results of Embodiments

The performance of the overall system, particularly the symbiotic relationship between the mode-scattering and sound-absorbing segments, is illustrated in the graph shown in FIG. 8. The graph shows comparison test results conducted in a NASA Lewis Research Center ANCF 48-inch fan, which generated (4,0) and (4,1) modes over varying frequencies, or fan rotational speeds, ranging from 1750 rpm to slightly less than 1900 rpm.

The graph contains five separate curves, which shall be discussed from the bottom-most curve upward. As the graph indicates for the bottom-most curve, with neither the passive nor active segment, there was 0–2 dB reduction of noise, or insertion loss. There was no sound-absorbing segment 400 for this curve, and the active-control portion of mode-scattering segment 200 was turned off; however, resonators 210 of the mode-scattering segment 200 absorbed sufficient sound energy operating in a passive mode to provide the small insertion loss shown.

The second curve moving upwards shows the attenuation of the passive liner used in sound-absorbing segment 400 with the mode-scattering segment 200 inactive. The performance of the passive liner ranged from about 3 to 10 dB reduction, depending upon the engine rpm. Note that the performance of the passive liner is very sensitive to frequency changes, a major limitation of all passive liner designs.

The third curve moving upwards shows the attenuation provided by the active control components 250 of mode-scattering segment 200 operating without the passive liner in sound-absorbing section 400. In this case, however, the active-control resonator components 250 did not mode scatter the sound field of the two radial modes, but instead absorbed the sound. The insertion loss was 20 to 23 dB over the frequency range tested, a marked improvement over the passive liner alone shown in the curve below.

The fourth curve moving upwards (second from the top) shows the sum of the insertion loss of the passive liner and the active-control segment. Without the symbiotic mode-scattering/sound-absorbing interaction of the two segments, one would expect the combination of the active and passive segments to achieve an attenuation equal to the sum of the attenuation of the passive liner and the active control component, which ranges from 25 to 31 dB.

However, as shown in the fifth curve moving upwards (the top-most curve), the actual attenuation of the hybrid active-passive sound-absorbing segmented liner system resulted in attenuation of 30 to 36 dB, about 5 dB more attenuation than expected by combining active and passive techniques. This increase clearly illustrates that whole of the hybrid system is greater than the sum of its parts, and that there is an unexpected interaction between the active and passive segments. That unexpected interaction is having the active-control portion act to scatter the sound field into higher modes instead of absorbing, reflecting or canceling the noise, thereby greatly increasing the performance of the passive liner.

Another similar embodiment was tested in a 22-inch diameter scaled turbofan engine to demonstrate the performance of the preferred embodiment under actual engine running conditions. The results of this test are shown in FIG. 9 for engine speeds ranging from 5,200 rpm to 6,200 rpm, with a mean flow of approximately Mach 0.2 to 0.3, depending upon fan speed. The test engine model contains 18 rotor blades and 45 stator vanes, resulting in generation of circumferential mode m=−9 at the blade passage second harmonic. Over the speed range 5,200–6,000 rpm, radial orders n=0 and n=1 are present. At 6,200 rpm, radial order n=2 is added.

The lower curve is a conventional passive liner over the entire engine inlet, which provided about 2 to 9 dB attenuation. The upper curve shows the performance of the hybrid mode-scattering/sound-absorbing segmented liner comprised of an active and passive segment. The hybrid liner provided about 7 to 18 dB attenuation.

Of particular interest is the data point at 5,400 rpm, which is the rotational speed for which the passive liner was designed to attenuate the second harmonic of blade-passage frequency tone noise. At this speed, the hybrid system achieved nearly 6 dB more attenuation than the standard passive liner system.

The present invention shown in FIGS. 14 may be used to reduce inlet or exhaust noise, depending upon which side of the rotor-stators the hybrid mode-scattering/sound-absorbing segmented liner is located. However, it may be desirable to have two hybrid mode-scattering/sound-absorbing segmented liners in a turbofan engine, one to reduce inlet noise and another to reduce exhaust noise. Each of the two such hybrid liners would likely be designed differently to maximize the sound attenuation for the acoustic characteristics peculiar to inlet and exhaust noise.

While the preferred embodiment of the present invention has been described for use in an aircraft engine, those skilled in the art will readily recognize that the invention may be used to attenuate noise in any duct. For example, the present invention may be used to control excessive noise in heating, ventilation and air-conditioning systems. For such systems, an input microphone (or array) may be used instead of fan tachometer 230.

Also, while the preferred embodiment of the present invention is particularly directed toward ducts with an air or fluid flow, those skilled in the art will recognize that the hybrid active-passive sound-absorbing segmented liner system would also perform well to attenuate noise in ducts containing liquids such as hydraulic ducts.

Furthermore, while the preferred embodiment employs digital signal processing, it is possible to use analog processing.

Additional advantages and modifications will readily occur to those skilled in the art. Thus while the preferred embodiment of the present invention has been disclosed and described herein, the invention in its broader aspects is not limited to the specific details, methods and representative devices shown and described herein. It will be understood by those skilled in the art that various changes in form and detail may be made therein without departing from the spirit and scope of the general inventive concept as defined by the appended claims and their equivalents.

What is claimed is:

1. A hybrid mode-scattering/sound-absorbing segmented liner system for attenuating a sound field in a duct comprising:
    a mode-scattering segment capable of mode scattering an initial sound field in the duct;
    an active-control component within the mode-scattering segment comprising a controller, a reference signal determined from the initial sound field, and a sound-generating device, whereby the controller, in response to the reference signal, is capable of causing the sound-generating device to generate sound that mode scatters the initial sound field into an altered sound field; and
    a sound-absorbing segment positioned acoustically downstream of the mode-scattering segment and that is capable of attenuating the altered sound field, resulting in an attenuated sound field;
wherein the mode-scattering segment further comprises a passive liner positioned adjacent to the active-control components opposite the sound-absorbing segment.

2. A hybrid mode-scattering/sound-absorbing segmented liner system for attenuating a sound field in a duct comprising:
    a mode-scattering segment capable of mode scattering an initial sound field in the duct;
    an active-control component within the mode-scattering segment comprising a controller, a reference signal determined from the initial sound field, and a sound-generating device, whereby the controller, in response to the reference signal, is capable of causing the sound-generating device to generate sound that mode scatters the initial sound field into an altered sound field; and
    a sound-absorbing segment positioned acoustically downstream of the mode-scattering segment and that is capable of attenuating the altered sound field, resulting in an attenuated sound field;
wherein the sound-generating device is a piezoelectric transducer and wherein the sound-absorbing segment further comprises an active-control component to attenuate the altered sound field.

3. A hybrid mode-scattering/sound-absorbing segmented liner system for attenuating a sound field in a duct comprising:
    a mode-scattering segment capable of mode scattering an initial sound field in the duct;
    an active-control component within the mode-scattering segment comprising a controller, a reference signal determined from the initial sound field, and a sound-generating device, whereby the controller, in response to the reference signal, is capable of causing the sound-generating device to generate sound that mode scatters the initial sound field into an altered sound field; and
    a sound-absorbing segment positioned acoustically downstream of the mode-scattering segment and that is capable of attenuating the altered sound field, resulting in an attenuated sound field;

wherein the reference signal is determined by a microphone positioned acoustically upstream of the mode-scattering segment.

4. A hybrid mode-scattering/sound-absorbing segmented liner system for attenuating a sound field in a duct comprising:
   a mode-scattering segment capable of mode scattering an initial sound field in the duct;
   an active-control component within the mode-scattering segment comprising a controller, a reference signal determined from the initial sound field, and a sound-generating device, whereby the controller, in response to the reference signal, is capable of causing the sound-generating device to generate sound that mode scatters the initial sound field into an altered sound field; and
   a sound-absorbing segment positioned acoustically downstream of the mode-scattering segment and that is capable of attenuating the altered sound field, resulting in an attenuated sound field;
wherein the initial sound field is generated by a fan positioned within the duct, and wherein the reference signal is determined from a fan tachometer that measures the rotational speed of the fan.

5. A hybrid mode-scattering/sound-absorbing segmented liner system for attenuating a sound field in a duct comprising:
   a mode-scattering segment capable of mode scattering an initial sound field in the duct;
   an active-control component within the mode-scattering segment comprising a controller, a reference signal determined from the initial sound field, and a sound-generating device, whereby the controller, in response to the reference signal, is capable of causing the sound-generating device to generate sound that mode scatters the initial sound field into an altered sound field;
   a sound-absorbing segment positioned acoustically downstream of the mode-scattering segment and that is capable of attenuating the altered sound field, resulting in an attenuated sound field; and
   an altered sound-measuring component positioned acoustically downstream of the mode-scattering segment and acoustically upstream of the sound-absorbing segment and that is capable of continuously measuring the altered sound field, wherein the controller, in response to the altered sound field as measured by the altered sound-measuring device, is capable of continuously altering the sound-generating device to maximize the mode scattering of the active-control component.

6. A hybrid mode-scattering/sound-absorbing segmented liner system for attenuating a sound field in a duct comprising:
   a mode-scattering segment capable of mode scattering an initial sound field in the duct;
   an active-control component within the mode-scattering segment comprising a controller, a reference signal determined from the initial sound field, and a sound-generating device, whereby the controller, in response to the reference signal, is capable of causing the sound-generating device to generate sound that mode scatters the initial sound field into an altered sound field;
   a sound-absorbing segment positioned acoustically downstream of the mode-scattering segment and that is capable of attenuating the altered sound field, resulting in an attenuated sound field; and
   an error sound-measuring component positioned acoustically downstream of the sound-absorbing segment and that is capable of continuously measuring the attenuated sound field, wherein the controller, in response to the attenuated sound field as measured by the error sound-measuring device, is capable of continuously altering the sound-generating device to minimize the attenuated sound field.

7. The system described in claim 6 wherein the controller includes a digital signal processor that uses a filtered-X least mean squared algorithm.

8. The system described in claim 6 wherein:
   the active-control component further comprises a plurality of sound-generating devices positioned circumferentially around the interior surface of the duct, each sound-generating device being connected to and controlled by the controller; and
   the error sound-measuring component further comprises an error-microphone array including a plurality of error microphones positioned circumferentially around the interior surface of the duct;
   wherein the number of sound-generating devices and the number of error microphones is predetermined according to the particular modal configurations of the initial sound field.

9. The system described in claim 8 wherein the error-microphone array further comprises a plurality of rows of circumferentially spaced error microphones in the axial direction.

10. The system described in claim 9 wherein the error microphones are flush mounted to the interior surface of the duct.

11. The system described in claim 8 wherein each of the plurality of sound-generating devices are positioned within a resonator.

12. The system described in claim 8 wherein each of the plurality of sound-generating devices is a piezoelectric transducer.

13. The system described in claim 12 wherein the sound-absorbing segment further comprises a passive liner having a plurality of resonators.

14. The system described in claim 13 wherein the mode-scattering segment further comprises a passive liner positioned adjacent to the active-control components opposite the sound-absorbing segment.

15. The system described in claim 14 wherein the initial sound field is generated by a fan positioned with the duct, and wherein the means for determining the initial sound field includes a fan tachometer that measures the rotational speed of the fan.

16. The system described in claim 15 wherein each of the plurality of piezoelectric transducers are positioned within a resonator.

17. The system described in claim 16 wherein the hybrid mode-scattering/sound-absorbing segmented liner is positioned within the inlet duct of a turbofan engine.

18. The system described in claim 16 wherein the hybrid mode-scattering/sound-absorbing segmented liner is positioned within the exhaust duct of a turbofan engine.

19. The system described in claim 16 wherein a first hybrid mode-scattering/sound-absorbing segmented liner is positioned within the inlet duct of a turbofan engine, and a second hybrid mode-scattering/sound-absorbing segmented liner is positioned within the exhaust duct of the turbofan engine.

20. A method for attenuating a sound field in a duct having an initial propagation angle in a duct comprising the steps of:
   determining the initial sound field in the duct;
   calculating an appropriate added sound field in response to the determined initial sound field such that the added sound field would mode scatter the initial sound field;

generating an added sound field in the duct that mode scatters the initial sound field into an altered sound field; and attenuating the altered sound to produce an attenuated sound field; wherein the sound field is generated by a fan within the duct, and wherein the step of determining the initial sound field further comprises the step of measuring the rotational speed of the fan.

21. A method for attenuating a sound field in a duct having an initial propagation angle in a duct comprising the steps of:

determining the initial sound field in the duct;

calculating an appropriate added sound field in response to the determined initial sound field such that the added sound field would mode scatter the initial sound field;

generating an added sound field in the duct that mode scatters the initial sound field into an altered sound field; and attenuating the altered sound to produce an attenuated sound field; wherein:

the step of calculating the added sound field further comprises the step of continuously determining the attenuated sound field; and the step of generating the added sound field further comprises continuously altering the added sound field in response to the attenuated sound field to minimize the attenuated sound field.

22. The method of claim 21 wherein the step of calculating the added sound field uses a filtered-X least mean square algorithm embodied within a digital signal processor.

23. The method of claim 21 further comprising the step of attenuating the initial sound field before performing the step of generating an added sound field.

24. The method of claim 21 wherein the added sound field is generated by a piezoelectric transducer.

25. The method of claim 24 wherein the step of attenuating the altered sound field uses a passive liner having a plurality of resonators.

26. The method of claim 25 wherein the sound field is generated by a fan within the duct, and wherein the step of determining the initial sound field further comprises the step of measuring the rotational speed of the fan.

27. The method of claim 26 wherein the piezoelectric transducers generate the added sound field within a resonator cavity.

28. The method of claim 27 wherein the duct is the inlet of a turbofan engine.

29. The method of claim 27 herein the duct is the exhaust of a turbofan engine.

30. The method of claim 27 wherein the method is applied in the inlet of a turbofan engine, and the method is again applied in the exhaust of the turbofan engine.

* * * * *

UNITED STATES PATENT AND TRADEMARK OFFICE
CERTIFICATE OF CORRECTION

| | | |
|---|---|---|
| PATENT NO. | : 5,979,593 | Page 1 of 1 |
| APPLICATION NO. | : 08/784732 | |
| DATED | : November 9, 1999 | |
| INVENTOR(S) | : Rice et al. | |

It is certified that error appears in the above-identified patent and that said Letters Patent is hereby corrected as shown below:

Title Page, Item [56], References Cited, U.S. Patent Documents, 4,109,108, please delete "Crown" and insert -- Coxon et al. --.

Col. 20, in Claim 29, Line 1, please delete "herein" and insert -- wherein --.

Signed and Sealed this

Seventeenth Day of April, 2007

JON W. DUDAS
*Director of the United States Patent and Trademark Office*